United States Patent [19]

Margetts

[11] 4,184,717
[45] Jan. 22, 1980

[54] CONTROL VALVE ASSEMBLIES FOR HYDRAULIC BRAKING SYSTEMS

[75] Inventor: Hugh G. Margetts, Leamington Spa, England

[73] Assignee: Girling Limited, Birmingham, England

[21] Appl. No.: 909,473

[22] Filed: May 25, 1978

[30] Foreign Application Priority Data

May 25, 1977 [GB] United Kingdom ............... 21957/77

[51] Int. Cl.² .............................................. B60T 15/04
[52] U.S. Cl. ................................... 303/52; 74/471 R; 251/229
[58] Field of Search ............. 74/471 R, 471 XY, 519, 74/522.2; 180/6.48; 251/229, 233; 303/6 R, 50

[56] References Cited

U.S. PATENT DOCUMENTS 2,935,890  5/1960  Hall ................................... 74/471 R
3,900,229  8/1975  Husted ................................... 303/52

FOREIGN PATENT DOCUMENTS 922102  3/1963  United Kingdom ...................... 303/52

Primary Examiner—Duane A. Reger
Attorney, Agent, or Firm—Scrivener, Parker, Scrivener & Clarke

[57] ABSTRACT

A control valve assembly for vehicle dual hydraulic braking systems is operated by a lever mechanism. The lever mechanism comprises first and second levers which are pivotally connected to each other by a first pivot. One lever acts on a valve mechanism for controlling pressurization of a distributor chamber, and the other lever is pivotally connected to a housing through a second pivot. Each lever acts on a respective one of a pair of brake-applying valves for controlling the supply of pressure fluid in the chamber to an outlet in the housing for connection to a wheel brake.

5 Claims, 3 Drawing Figures

CONTROL VALVE ASSEMBLIES FOR HYDRAULIC BRAKING SYSTEMS

SPECIFIC DESCRIPTION

This invention relates to improvements in control valve assemblies for vehicle dual hydraulic braking systems of the kind in which separate brake-applying valves in a common housing are operable independently or simultaneously to cause hydraulic fluid from a distributor chamber in the housing to be supplied to one or both of a pair of outlets for connection to brakes on wheels on opposite sides of a vehicle.

The brake-applying valves can be operated simultaneously for retarding the vehicle or separately for steering.

Known control valve assemblies of the kind set forth are usually operated by a yoke comprising a one-piece member which is pivotally connected at substantially the mid-point in its length to operating mechanism for a valve means for controlling presurisation of the distributor chamber and, at opposite ends, is coupled to different pedals, the yoke also being provided with spaced abutments for operating the brake-applying valves. When both pedals are operated simultaneously the yoke is moved bodily away from the housing to withdraw and operate the mechanism for the valve means and allow both brake-applying valves to open so that pressure fluid in the distributor chamber is supplied to both outlets. When one pedal is operated on its own, initially the yoke pivots about the pivotal connection with the valve-operating mechanism with the abutment for the brake-applying valve corresponding to the pedal moving away from the said brake-applying valve which can open and the other abutment closing the other brake-applying valve. Further movement of that pedal in the same direction acts through the yoke to increase the closing force applied to the said other brake-applying valve, and withdraws the valve-operating mechanism from the housing to pressurise the distributor chamber from which pressurised fluid is supplied through the open brake-applying valve to the brakes on that side of the vehicle. When the valve means comprises a normally-closed inlet valve and a normally-open reservoir valve which are interpendent, withdrawal of the mechanism by the yoke applies pull to the reservoir valve which, after closure, is transmitted to the inlet valve.

According to our invention a control valve assembly of the kind set forth is operated by means of a lever mechanism comprising first and second levers which are pivotally connected to each other by a first pivot with one lever having an operating face acting on an operating mechanism for a valve means for controlling pressurisation of the distributor chamber and the other lever being pivotally connected to a fixed point on the housing through a second pivot, each lever acting on a respective one of the brake-applying valves, the arrangement being such that movement of one or both levers in a brake-applying direction permits the corresponding brake-applying valve to open and the reaction on the pivots causes the operating face to move relatively towards the housing and to actuate the valve-operating mechanism, the reaction forces in response to independent movement of the levers in the brake applying direction also causing the other non-actuated lever to close the respective brake-applying valve.

Preferably each lever acts on the respective brake-applying valve through an abutment face on the lever disposed outwardly from the pivots.

This ensures that the valve-operating mechanism is positively operated by a direct thrust transmitted to it through the operating face, and the operation is not affected by a pull transmitted from one part to another after lost-motion clearances have been taken-up.

Preferably the first lever is connected at an intermediate point in its length to the housing through the second pivot and its free inner end is connected through the first pivot to an intermediate point in the length of the second lever, the operating face being provided on the second lever at its free inner end.

When both levers are moved simultaneously in a brake-applying direction, both levers act as levers of the first order, but when each lever is operated on its own the first lever acts as a lever of the first order but the second lever acts as a lever of the second order.

When the valve-operating mechanism comprises an operating-rod which is guided for sliding movement in the housing, the operating face has a sliding engagement with the free end of the rod which projects from the housing.

One embodiment of my invention is illustrated in the accompanying drawings in which.

Figure 1:
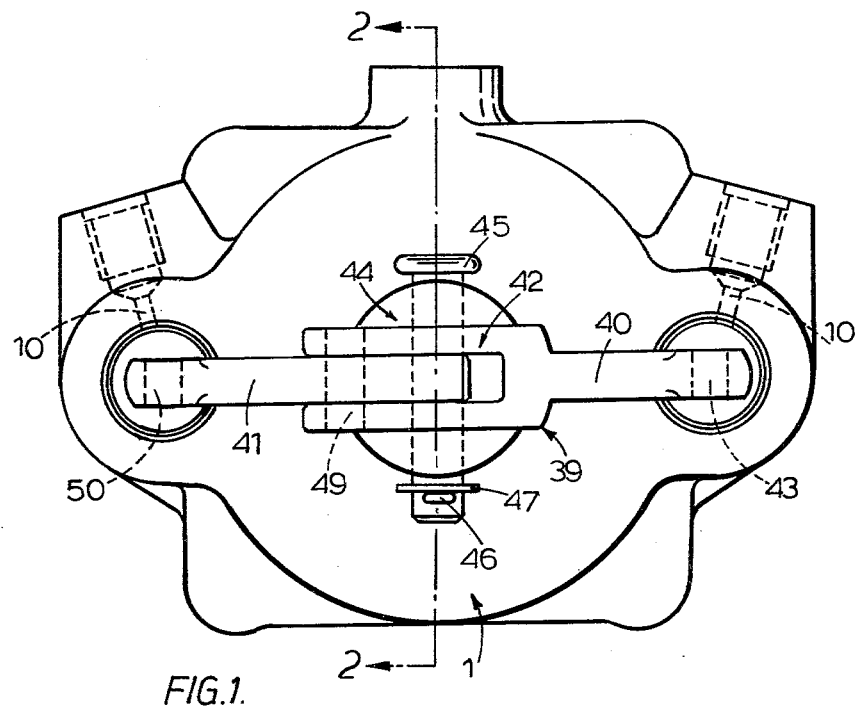
FIG. 1 is an end elevation of a control valve assembly for a vehicle hydraulic braking system.
Figure 2:
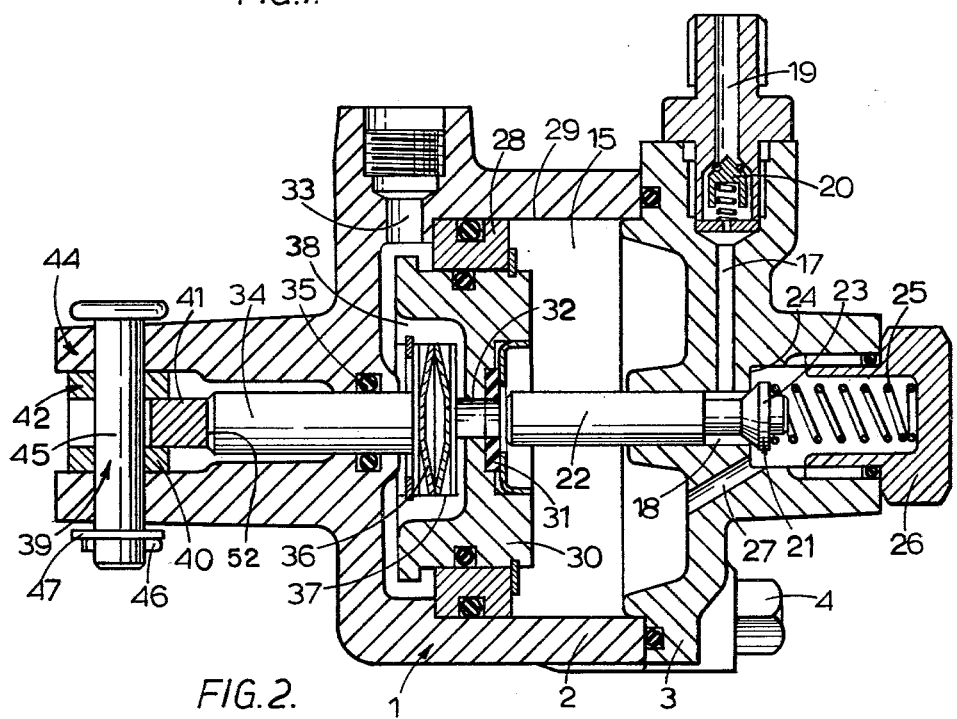
FIG. 2 is a longitudinal section through the valve assembly on the line 2—2 of FIG. 1.
Figure 3:
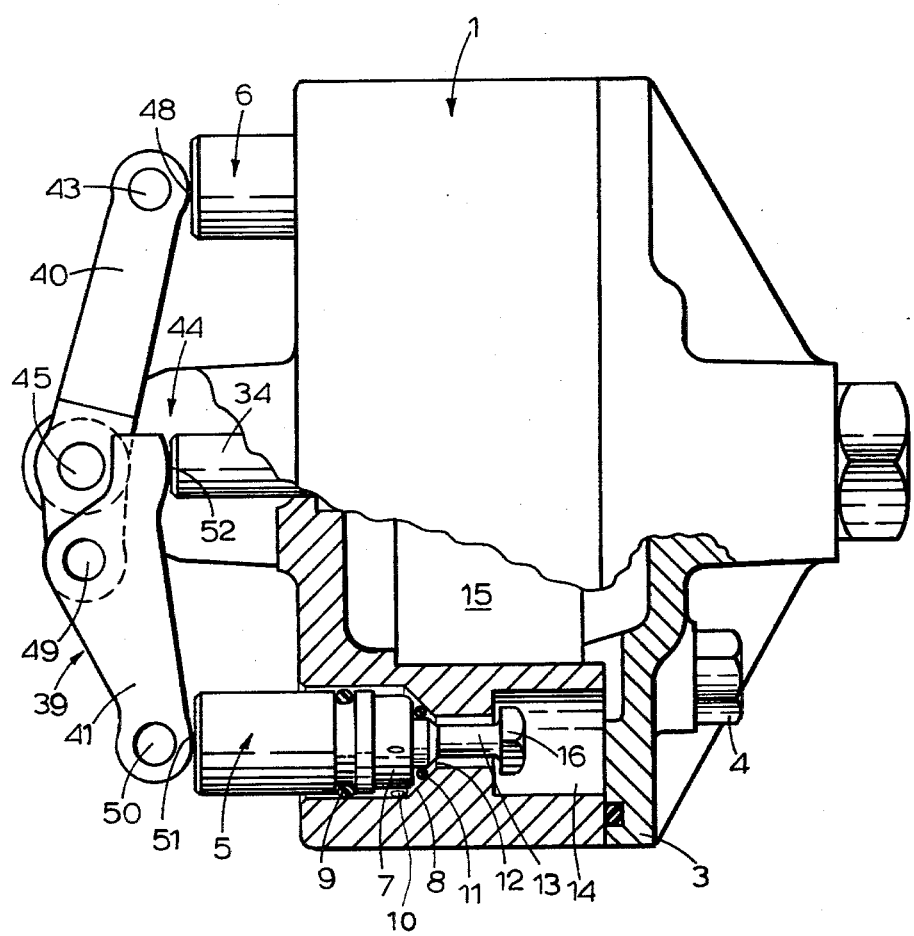
FIG. 3 is a plan containing a section through one of the brake-applying valves.

The control valve assembly shown in the drawings comprises a housing 1 comprising a body 2 of cup-shaped outline, and a closure plate 3 wich is clamped against a face at the open end of the body 2 by means of bolts 4.

A pair of brake applying valves 5 and 6 are mounted in the body 2, and each valve 5, 6 comprises a spool 7 which works in a bore 8 and projects at its outer end from the body 2. Each spool 7 carries a radial seal 9 which seals with a portion of the bore on the axially outer side of a radial outlet passage 10 for connecting brakes on one side of the vehicle, and the spool 7 has an inner end portion of reduced diameter carrying a seal 11 for engagement with a seating 12 defined by a complementary radial face at the inner end of the bore 8. The inner end of each spool 7 carries an axial extension 13 which projects into a passage 14 which leads into a distributor chamber 15 defined by a cylindrical chamber in the body 2 which is closed by the plate 3. The free end of the extension 13 carries an enlarged head 16 forming a stop to limit movement of the spool 7 in an outward direction.

The plate 3 includes a radial inlet passage 17 which connects a bore 18 at the center of the plate 3 with a union 19 for connection to a high pressure pump through a one-way valve 20 which is housed in the inner end of the union 19.

Communication between the inlet passage 17 and the distributor chamber 15 is controlled by a pressure control valve 21. The control valve 21 comprises a plunger 22 which is guided to slide in the bore 18 and has an enlarged valve head 23 which is normally urged into a closed position in engagement with a complementary seating 24 in the plate 3 by means of a compression spring 25. The compression spring 25 is in abutment with a hollow closure member 26 for sealingly closing the outer end of the bore 18, and the interior of the closure member is connected to the chamber 15 through an inclined passage 27.

A first annular outer piston 28 of substantial diameter works in the cylindrical bore 29 of the body 2 and a second annular inner piston 30 is mounted in the first piston 28 for relative sliding movement in a sealing manner through a limited distance. Both pistons 28 and 30 are normally located adjacent to the end of the bore 29 which is remote from the plate 3 and, in this position, the free end of the plunger 22 is spaced from a seating 31 surrounding the central opening 32, in the piston 30. The plunger 22 and the seating 31 define a recuperation valve which is open when the valve assembly is in an inoperative position so that the chamber 15 is in free communication with a passage 33 on the opposite side of the pistons 28 and 30 for connection to a reservoir for hydraulic fluid for supplying the pump.

An operating-rod 34 projects into the bore 29 through a seal 35 in the adjacent closed end of the body 2 and acts on the inner piston 30 through an assembly 36 of Belleville or similar resilient washers which are housed in a recess 37 in the piston 30. The recess 37 is formed with a series of circumferentially spaced flutes or ribs 38 which maintain communication between opposite sides of the piston 30 through the opening 32 and, at their inner ends, locate the Belleville washers in position.

Operation of a valve means comprising the recuperation valve and the pressure control valve 21, and the brake-applying valves 5 and 6 is controlled by a lever mechanism 39 which, in turn, is responsive to operation of a pair of pedals (not shown).

As illustrated the lever mechanism comprises a first lever 40 and a second lever 41. The first lever 40 has a bifurcated inner end portion 42 and is coupled at its outer end to one of the pedal by a pivotal connection 43 so that the pedal applies a pull to the outer end of the lever 40 to urge it away from the valve 6. At an intermediate point in its length the bifurcated portion 42 is received within a bifurcated portion 44 at the end of the body 2 in which it is pivotally mounted for movement about a headed transverse pivot pin 45. The pin 45 is passed through aligned openings in the limbs of the bifurcated portions 42 and 44 and is retained in position by a split pin 46 and washer 47. The outer end of the first lever 40 also defines an abutment 48 normally acting on the free end of the spool of the brake-applying valve 6. The free inner end of the first lever 40 at the outer end of the bifurcated portion 42 is connected to an intermediate point in the length of the second lever 41 which it receives by means of a pivotal connection 49. The outer end of the second lever 41 is coupled through a pivotal connection 50 to the other of the pedals and that end defines an abutment 51 normally acting on the free end of the spool 7 of the brake-applying valve 5. Again operation of the other pedal applies a pull to the outer end of the lever 41 through the pivotal connection 50 to urge it away from the valve 5. The free inner end of the second lever 41 lies inside the pivot pin 45 and is shaped to provide a curved operating face 52 for sliding engagement with the free outer end of the operating rod 34.

In the inoperative position showh in which both the brake-applying valves 5 and 6, are open and the pressure control valve 21 is closed, the recuperation valve is open so that both the distributor chamber 15 and the brakes are in communication with the reservoir. Specifically the brakes communicate with the reservoir through the passages 10, through the bores 8 and past the seals 11, through the passage 14 and the distributor chamber 15, and between the plunger 22 and the seating 31. Since the pressure control valve 21 is closed, the high pressure pump is isolated from the distributor chamber 15.

When the brakes on opposite sides of the vehicle are to be applied simultaneously for vehicle retardation both pedals are operated simultaneously to move the outer ends of the levers 40 and 41 away from the body 2 with the first lever pivoting about the pivotal connection 45, and the second lever pivoting about the pivotal connection 49 with the first lever. The abutments 48 and 51 are thus moved away from the brake-applying valves 5 and 6 to ensure that they are fully open, and the operating face 52 moves relatively towards the body 2 to apply an axially directed force to the free end of the operating rod 34. This moves the rod 34 into the body 2 acting through the Belleville washer 36 to advance the inner piston 30 with respect to the outer piston 28 until the valve seating engages with the free end of the plunger 22. This closes the recuperation valve to isolate the chamber 15 from the reservoir. Further movement of the rod 34 in the same direction is then transmitted through the seating 31 to the plunger 22 which urges the head 23 away from the seating 24 so that fluid from the pump is admitted to the chamber 15 from whence it passes to the wheel brakes through the open brake-applying valves 5 and 6. Specifically the fluid in the chamber 15 flows through the passages 14, and between the seals 11 and the passages 8 to the outlet passages 10. Under these conditions both levers act as levers of the "first order".

By providing a common chamber 15 the pressure supplied to both sets of brakes is equalised to avoid differential wear of the linings.

When the brakes on one side of the vehicle are to be applied for steering, say those applied by the valve 5, the pedal coupled to the connection 50 is operated to moves the second lever 41 angularly about the pivotal connection 49, the outer end of the second lever 41 moving away from the valve 5 so that the valve 5 can open fully and with the operating face 52 being urged into engagement with the adjacent end of the rod 34. This causes the operating face 52 to actuate the valve means to pressurise the chamber 15 as described above. Simultaneously or slightly before, that the reaction on the pivotal connection 49 from the valve means moves the first lever angularly about the connection 45 to urge the abutment 48 into engagement with the spool of the valve 6, moving same inwardly to close the valve and prevent fluid from the chamber 15 passing through the outlet passage 10 from that valve, as it is free to do through the other, open, valve 5.

When the brakes on the other side of the vehicle are to be applied the other pedal is operated on its own to move the first lever 40 angularly about the fixed pivotal connection 45 and the load transmitted to the second lever 41 through the pivot 49 causes the operating face 52 on second lever 41 to operate the valve means as described above and for the abutment 51 to act to close the brake-applying valve 5.

When the other pedal is operated on its own, the first lever acts as a lever of the "first order" but the second lever acts as a lever of the second order.

The distributor chamber and the bore 29 on both sides of the piston 28 and 30 are normally filled with fluid at atmospheric pressure in the inoperative position. Since the one-way valve 20 prevents a reverse flow of fluid to the pump, should the pump fail, the brakes can still be applied by pressurisation of the volume of fluid trapped in the bore 29 after the recuperation valve has closed and upon further movement of the piston 30 accompanied by the piston 28, irrespective of whether the pedals are operated simultaneously or independently.

I claim:

1. A control valve assembly for a vehicle dual hydraulic braking system comprising a housing provided with a distributor chamber, and first and second outlets for connection to brakes on wheels on opposite sides of the vehicle, valve means for controlling pressurisation of said chamber, first and second brake-applying valves for controlling communication between said distributor chamber and a respective one of said outlets, and a lever mechanism, said lever mechanism comprising a first lever, a second lever, a first pivot pivotally connecting said first and second levers to each other, each of said levers having an abutment face which is movable in one direction with respect to a respective one of said brake-applying valves to urge the said one valve into a closed position and movable in a second opposite direction with respect to the said one valve to permit the said one valve to move into a fully open position, a second pivot pivotally connecting one of said levers to a fixed point on said housing, and an operating face on the other of said levers acting on said valve means to pressurise said distributor chamber when at least one of said levers is moved in a brake-applying direction with said abutment face on the said one lever moving in said second opposite direction to permit the respective one of said brake-applying valves to move into said fully-open position, the reaction forces on said pivots in response to independent movement of said levers in a brake-applying direction also causing the other of said levers which is non-actuated to close the respective one of said brake-applying valves.

2. A control valve assembly as claimed in claim 1, wherein said abutment face on each said lever is disposed outwardly from said pivots.

3. A control valve assembly as claimed in claim 1, wherein a second pivot connects said first lever at an intermediate point in its length to said housing, and said first lever has a free inner end which is connected through said first pivot to an intermediate point in the length of said second lever, said operating face being provided on said second lever at its free inner end.

4. A control valve assembly as claimed in claim 1, wherein said operating face has a sliding engagement with said vavle means.

5. A control valve assembly as claimed in claim 4, wherein said valve means has an operating rod guided for sliding movement in said housing and with which said operating face has a sliding engagement.

* * * * *